(12) United States Patent
Quirk et al.

(10) Patent No.: US 7,157,549 B2
(45) Date of Patent: Jan. 2, 2007

(54) POLYMERIZATION OF OXIRANES WITH A LITHIUM-CONTAINING INITIATOR

(75) Inventors: Roderic P. Quirk, Akron, OH (US); Robert T. Mathers, Gibsonia, PA (US)

(73) Assignee: The University of Akron, Akron, OH (US)

( * ) Notice: Subject to any disclaimer, the term of this patent is extended or adjusted under 35 U.S.C. 154(b) by 113 days.

(21) Appl. No.: 10/852,980

(22) Filed: May 25, 2004

(65) Prior Publication Data

US 2005/0038227 A1 Feb. 17, 2005

(51) Int. Cl.
*C08G 65/10* (2006.01)

(52) U.S. Cl. .................................. 528/409; 528/421
(58) Field of Classification Search ................ 528/409, 528/421

See application file for complete search history.

(56) References Cited

U.S. PATENT DOCUMENTS

| | | | | |
|---|---|---|---|---|
| 4,209,594 A * | 6/1980 | Welsh et al. | ................. | 525/71 |
| 4,248,998 A | 2/1981 | Udovich et al. | ............ | 528/296 |
| 4,279,798 A | 7/1981 | Aggarwal et al. | ..... | 260/33.4 R |
| 4,330,677 A | 5/1982 | Linke et al. | ................. | 562/583 |
| 4,362,857 A | 12/1982 | Yonezawa et al. | .......... | 528/174 |
| 4,367,298 A | 1/1983 | Abbey et al. | ................. | 523/402 |
| 4,396,780 A | 8/1983 | Shtykh et al. | .............. | 568/620 |
| 4,397,993 A | 8/1983 | Tefertiller et al. | .......... | 525/328 |
| 4,609,719 A | 9/1986 | Chattha | ........................ | 528/98 |
| 4,611,046 A | 9/1986 | Chattha | ........................ | 528/98 |
| 4,711,950 A | 12/1987 | Miura et al. | ................. | 528/409 |
| 4,841,017 A | 6/1989 | Murai et al. | ............. | 525/327.3 |
| RE33,367 E | 10/1990 | Miura et al. | ................. | 528/409 |
| 5,026,816 A | 6/1991 | Keehan | ........................ | 528/94 |
| 5,122,586 A | 6/1992 | Sakai et al. | ................. | 528/103 |
| 5,140,091 A | 8/1992 | Sakai et al. | ................. | 528/103 |
| 5,169,912 A | 12/1992 | Keehan | ....................... | 525/523 |
| 5,187,255 A | 2/1993 | Matsuo | ........................ | 528/176 |
| 5,648,557 A | 7/1997 | Wei | .............................. | 568/617 |
| 5,658,996 A | 8/1997 | Keehan | ........................ | 525/523 |
| 5,741,946 A | 4/1998 | Wei | .............................. | 568/617 |
| 5,756,604 A | 5/1998 | Nakaoka et al. | .............. | 526/69 |
| 5,874,501 A | 2/1999 | Keehan | ........................ | 525/109 |
| 5,998,327 A | 12/1999 | Hofmann et al. | ........... | 502/175 |
| 6,093,793 A | 7/2000 | Hofmann et al. | ........... | 528/411 |
| 6,207,794 B1 | 3/2001 | Yamasaki et al. | ........... | 528/408 |
| 6,284,847 B1 * | 9/2001 | Allgaier et al. | ............. | 525/529 |
| 6,291,388 B1 | 9/2001 | Hofmann et al. | ........... | 502/154 |

OTHER PUBLICATIONS

Quirk, et al., Journal of Polymer Science: Part A: Polymer Chemistry, vol. 26, 2031-2037 (1988).*

\* cited by examiner

*Primary Examiner*—Kuo-Liang Peng
(74) *Attorney, Agent, or Firm*—Roetzel & Andress, LPA; George W. Moxon, II

(57) ABSTRACT

A method is provided for polymerizing oxiranes by employing a lithium-containing polymerization initiator in a liquid reaction medium devoid of polymerization additives. Linear and star polymers can be produced by practicing the subject method.

7 Claims, 7 Drawing Sheets

(a)

(b)

(a)

(b)

(a)

(b)

POLYMERIZATION OF OXIRANES WITH A LITHIUM-CONTAINING INITIATOR

TECHNICAL FIELD

This invention relates to a method for polymerizing oxiranes by employing a lithium-containing polymerization initiator in a liquid reaction medium that is substantially devoid of polymerization additives.

BACKGROUND OF THE INVENTION

Monomers having ethylene-oxide functionalities are commonly known as oxiranes. Oxiranes can be polymerized to form polymers having well-known utility in a variety of practical applications. Nonlimiting examples of the practical applications include dispersing aids, surfactants, and reinforcing fillers.

In order to polymerize oxiranes, any one of the many well-known polymerization methods can be employed. These well-known methods typically utilize alkoxide and hydroxide initiators with alkali-metal counterions other than lithium. However, of the well-known polymerization methods for oxiranes, there are only a few that employ a lithium-containing polymerization initiator. Still further, of those methods that do employ a lithium-containing polymerization initiator, all of them employ the lithium-containing polymerization initiator in combination with polymerization additives. The polymerization additives that are most commonly employed are Lewis acids and Lewis bases. For instance, there are well-known methods for polymerizing ethylene oxide that employ a polystyryllithium initiator in combination with polymerization additives such as dimethyl sulfoxide, KOR+, or P4 base.

In fact, the prior art teaches away from attempting to polymerize oxiranes such as propylene oxide by employing lithium-containing polymerization initiators in reaction mediums devoid of polymerization additives. For example, it has been published, in *J. Am. Chem. Soc.* 1956, 78, 3432, that attempted polymerization of propylene oxide with a lithium counterion yields no polymer.

Due to the commercial demand for polyoxiranes, there is a need for additional methods directed to their synthesis.

SUMMARY OF THE INVENTION

The present invention provides a polyoxirane-functionalized polymer comprising the polymerization reaction product of oxirane monomers initiated by a lithium-containing polymerization initiator, wherein a liquid reaction medium that is substantially devoid of polymerization additives is employed.

The present invention also provides a polymer comprising the reaction product of polymerizing oxiranes using a lithium-containing polymerization initiator in a liquid reaction medium, wherein the liquid reaction medium is substantially devoid of polymerization additives.

The present invention advantageously improves the art because it eliminates the alleged need for polymerization additives when polymerizing certain oxiranes using a lithium-containing initiator.

DETAILED DESCRIPTION OF ILLUSTRATIVE EMBODIMENTS

Figure 1:
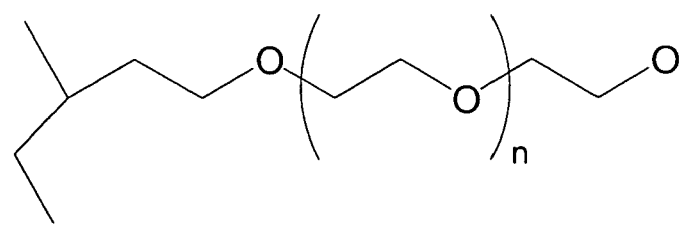
FIG. 1 is a $^{13}$C NMR spectra in CDCl$_3$ for the reaction product of sec-butyllithium initiation of neat ethylene oxide.
Figure 1:
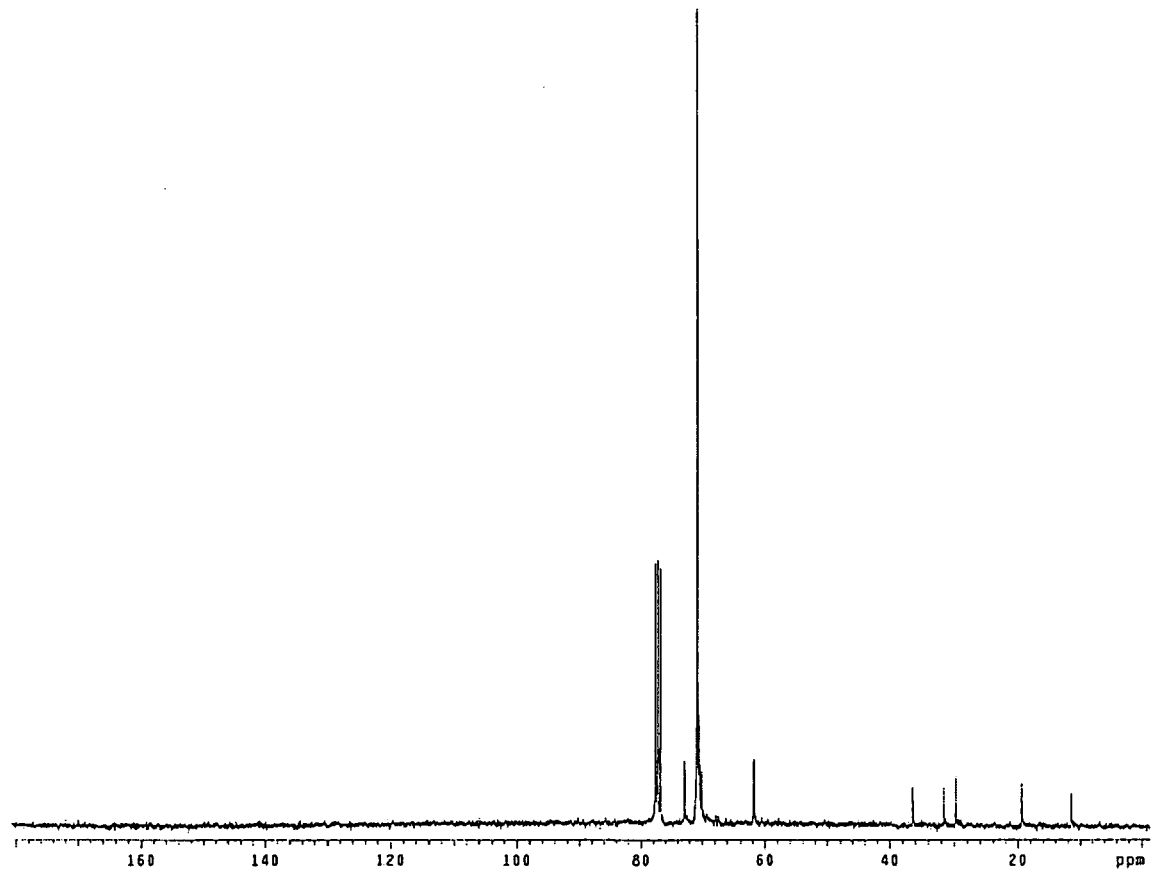

The present invention provides a method for polymerizing oxiranes by employing a lithium-containing polymerization initiator in a liquid reaction medium that is substantially devoid of polymerization additives. The polymerization reaction can generally be described by the reaction scheme:

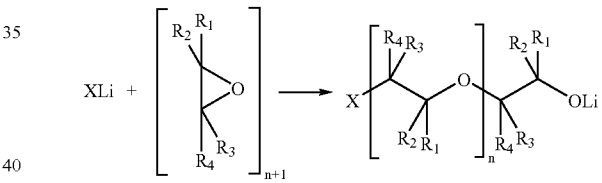

where each XLi is a lithium-containing polymerization initiator;

where each R is selected independently and is hydrogen, fluorine, nitrogen, alkyl, or fluorinated alkyl;

where R$_1$, R$_2$, R$_3$, and R$_4$ are not all alkyl or fluorinated alkyl groups; and where n represents the number of polymeric units.

Any lithium-containing polymerization initiator can be employed in practicing the present invention. Nonlimiting examples of employable initiators include: organolithium (RLi), organonitrolithium (RNLi), organothiolithium (RSLi), organooxylithium (ROLi), thiolithium (SLi), oxylithium (OLi), nitrolithium (NLi), and phosphorolithium (Pli). Preferred lithium-containing initiators include sec-butyl lithium and polystyryllithium.

In addition to the lithium-containing initiators described above, it is appreciated that their multifunctional analogs are also employable. A multifunctional analog can be understood as a compound having at least two lithium-containing functionalities. For example, LiOROLi is a difunctional analog of ROLi. Additionally, where a multifunctional analog is branched, a polyoxirane star polymer can be synthesized wherein the number of arms on the star polymer is equal to the number of lithium-containing initiators on the analog. For example a branched trifunctional lithium-containing analog would yield a star polyoxirane as represented by the simplified reaction scheme:

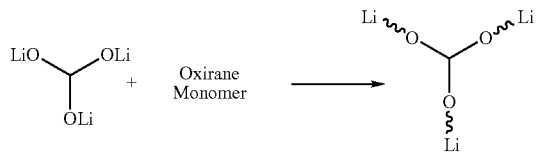

Lithium-containing polymerization initiators are well known and can be purchased commercially or synthesized using conventional methods by persons having ordinary skill in the art. An example of a method for synthesizing a lithium-containing polymerization initiator uses a sec-butyl lithium initiator to polymerize styrene and thereby yield a poly(styryl)lithium reaction product that can be used as an initiator.

The types of oxiranes that can be polymerized by the method of the present invention include ethylene oxide, fluorinated ethylene oxide, and alkyl and fluorinated alkyl groups comprising at least one ethylene oxide functionality. The subject oxirane monomer can be represented by the general formula:

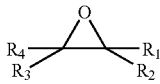

where each R is selected independently and is hydrogen, fluorine, nitrogen, alkyl, or fluorinated alkyl; and where $R_1$, $R_2$, $R_3$, and $R_4$ are not all alkyl or fluorinated alkyl groups.

The polymerization additives can generally be described as Lewis acids and Lewis bases. Nonlimiting examples of polymerization additives are dimethyl sulfoxide (DMSO), alkyl potassium ether ($KOR^+$), and t-Bu—$P_4$ Base (polyaminophosphazene). Other Lewis acids and Lewis bases that are known in the art are considered polymerization additives.

In one embodiment for polymerizing oxiranes, the oxiranes make up the major component by weight of a liquid reaction medium. The major component by weight of the liquid reaction medium contributes most to the weight of the liquid reaction medium than any of the other components. In a preferred embodiment, a neat oxirane liquid is the liquid reaction medium.

Where oxiranes make up the major component of the liquid reaction medium, the solvent that is employed is not limited in any way, but nonpolar organic solvents are preferred. A nonlimiting example of such a solvent is benzene.

As is well known in the art, the number of equivalents directly affects the number of polymeric units that make up the oxirane polymer. An equivalent is herein understood as the ratio of the number of moles of oxirane monomer to the number of moles of lithium-containing initiator. Therefore, three equivalents describes three moles of monomer for each mole of initiator.

Oligomers are herein understood to have a number of polymeric units ranging from 3 to 100. And polymers are herein understood as having a number of polymeric units greater than 100. In practicing the present invention, from about three to greater than about 100 equivalents can be employed. Naturally, oligomers are produced from about 3 to about 100 equivalents, and polymers are produced from using greater than 100 equivalents. Persons of ordinary skill in the art will be able to employ the appropriate number of equivalents based on the desired number of polymeric units in the resultant polymer without undue experimentation. The number-average molecular weight ($M_n$) of a resultant polymer is herein understood as the weight of monomer consumed during polymerization divided by the moles of initiator.

At room temperature and atmospheric pressure, oxiranes are generally in a gaseous state, and therefore in order to practice the present invention it is necessary to carry out polymerization at temperatures and pressures in which the oxiranes are in a liquid state. At atmospheric pressure, the temperature range at which ethylene oxide is in the liquid state is generally about $-111°$ C. to about $11°$ C. And persons having ordinary skill in the art can discover adequate temperatures and pressures at which to conduct polymerization of oxiranes without undue experimentation. The relationship between temperature and pressure is well known, so persons of ordinary skill in the art can easily determine temperature and pressure combinations that can be employed.

The time required for polymerization is a function of the reaction stoichiometry, and persons having ordinary skill in the art can readily determine how long to allow polymerization to proceed without undue experimentation. Generally, 680 equivalents at $50°$ C. should be allowed to react for a time ranging from about 5 to about 10 days. Preferably, 680 equivalents at $50°$ C. should be allowed to proceed for about 7 days.

In order to demonstrate reduction to practice of the present invention, the following examples have been performed. The examples should not, however, be viewed as limiting the scope of the invention. The claims will serve to define the invention.

EXPERIMENTAL

Ethylene Oxide Purification

Ethylene oxide (99.5+%, Aldrich) was condensed onto $CaH_2$, stirred for 4 h and vacuum distilled onto neat $Bu_2Mg$ (in hexanes, FMC Lithium Division) and stirred for 4 h. After several freeze-pump-thaw cycles, the ethylene oxide was vacuum distilled into an ampoule equipped with a breakseal. After heat-sealing, the ampoule was attached to the reactor.

Neat Ethylene Oxide Polymerization using Lithium as Counterion

ω-(2-lithiumethoxy)polystyrene with [EO]/[Li]=620 Equivalents

Following styrene (1.0 mL) initiation with sec-BuLi (0.31 mL, 0.45 mmol) in benzene (15 mL), the resulting poly (styryl)lithium ($M_n$=2000 g/mol, 0.45 mmol) was functionalized with ethylene oxide (0.2 mL, 4.5 mmol) in benzene (5 mL). After 15 minutes, the polymer solution was cooled slowly using a dry ice/isopropyl alcohol bath until frozen and the breakseal connecting the reactor to the vacuum line was smashed to allow freeze-drying overnight (12 h). Neat ethylene oxide (280 mmol, 14 mL) was vacuum distilled from $Bu_2Mg$ onto the freeze-dried polymer. After 67 h, 2 mL methanol was added, the excess ethylene oxide was removed and the polymer was dried in a vacuum oven.

ω-(2-lithiumethoxy)polystyrene with [EO]/[Li]=1220 Equivalents

Styrene (2.4 mL) was initiated with sec-BuLi (0.74 mL, 0.43 mmol) in benzene (12 mL). A base polymer sample was taken by pouring a portion (1.59 g) of the resulting poly (styryl)lithium ($M_n$=2600 g/mol, $M_w/M_n$=1.05, 0.43 mmol) into a side ampoule and heat sealing the ampoule with a hand torch, followed by termination with degassed methanol. The remaining 0.59 g of poly(styryl)lithium (0.23 mmol) was reacted with 0.17 mL ethylene oxide (3.4 mmol) in 2 mL benzene. After 15 minutes, the reactor was reattached to the vacuum line. The polymer solution was cooled slowly until frozen and exposed to vacuum to allow freeze-drying overnight (12 h). Ethylene oxide (280 mmol, 14 mL) was distilled from $Bu_2Mg$ into the reactor. The porous freeze-dried polymer wafer dissolved immediately and the reactor was initially kept at 0° C. and then warmed to room temperature. After 207 h (8.6 days), the reactor was opened, methanol was added (1 mL) and the ethylene oxide was evaporated.

sec-Butuyllithium with [EO]/[Li]=680 Equivalents

After evacuating a glass ampoule on the vacuum line, the ampoule was purged with dry nitrogen (99.998%) and sec-butyllithium (0.11 mL, 0.19 mmol) was added by syringe through a side port. Following heat-sealing of the side port was with a hand torch, the solvent containing the initiator was removed under vacuum. After the ampoule was cooled with a dry ice/isopropyl alcohol bath, ethylene oxide (6.6 mL, 130 mmol) was vacuum distilled from neat $Bu_2Mg$ into the ampoule. The ampoule was removed from the vacuum line by heat-sealing with a hand torch and heated to 50° C. in an oil bath behind a safety shield in the hood. The ampoule was removed from the oil bath after 170 h and cooled in a dry ice/isopropyl alcohol bath before the ampoule was opened. Methanol (0.5 mL) was added and the ethylene oxide was evaporated. The resulting polymer was not precipitated into methanol, but was dried in the vacuum oven overnight.

Figure 2:
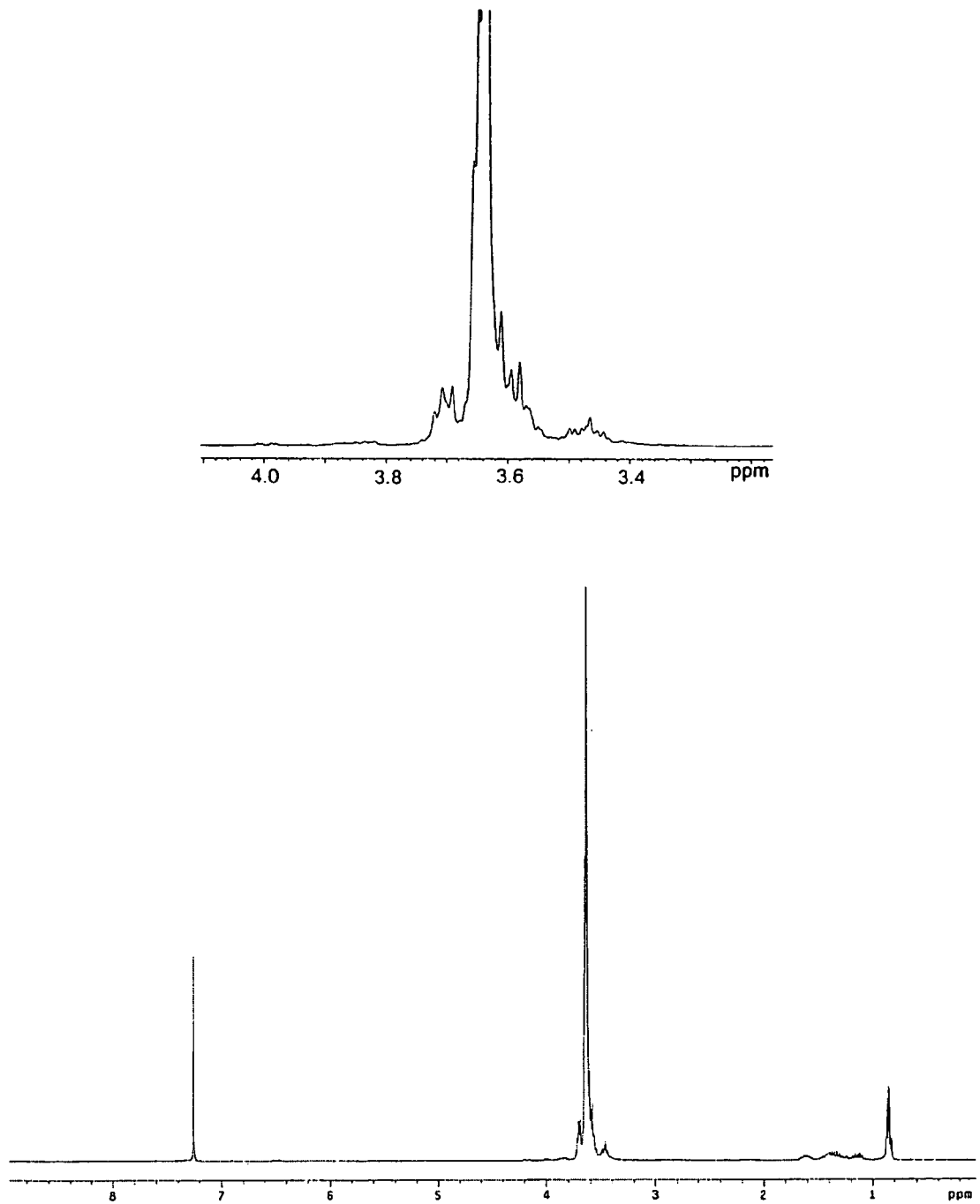
FIG. 2 is a $^1$H NMR spectra in CDCl$_3$ for the reaction product of sec-butyllithium initiation of neat ethylene oxide at 50° C.
Figure 3:
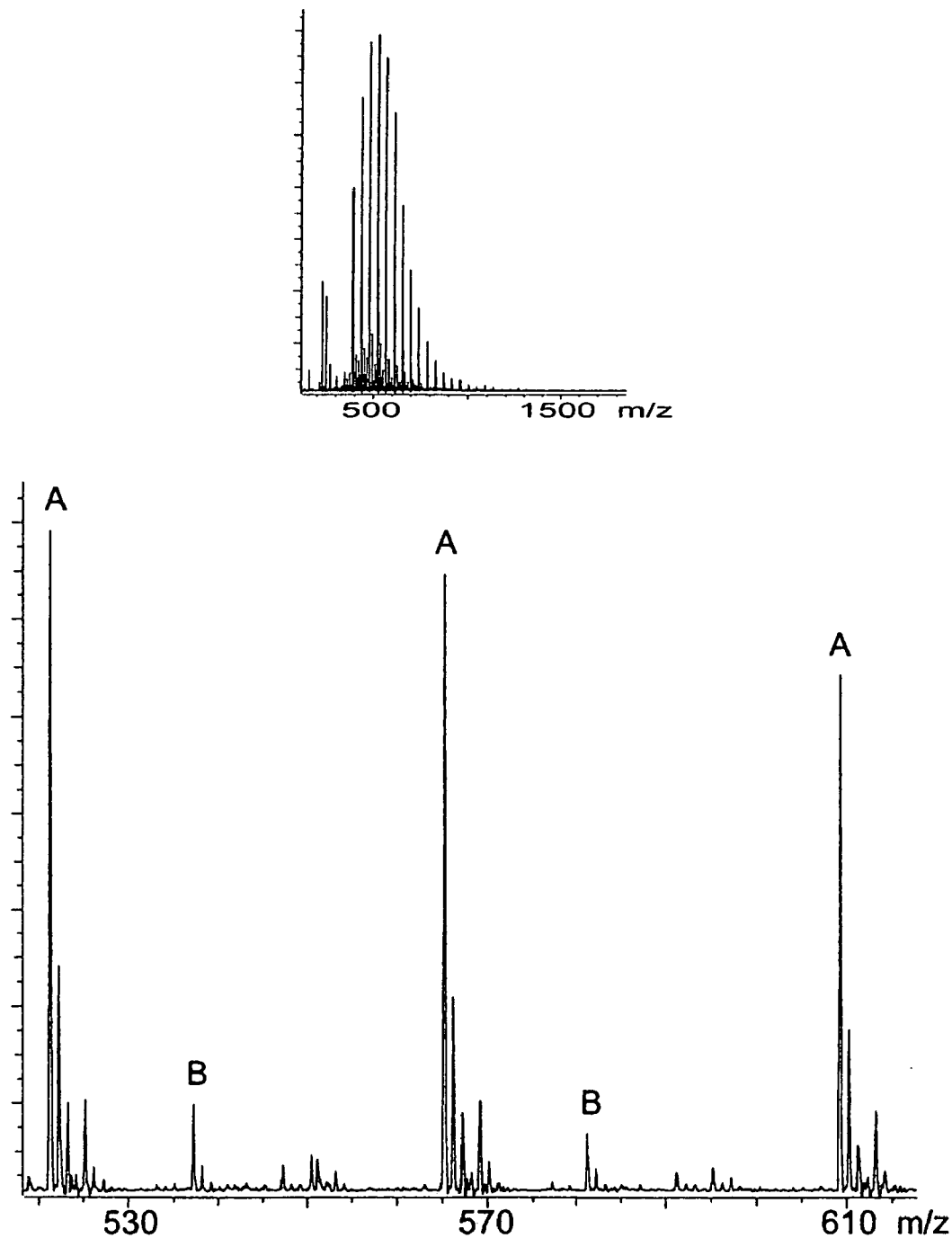
FIG. 3 is a MALDI-TOF mass spectrum of poly(ethylene oxide) that was initiated with sec-butyllithium using neat ethylene oxide. The poly(ethylene oxide) was dissolved in CHCl$_3$ and sodium was used as the cation.

Neat ethylene oxide was initiated with sec-butyllithium (680 equivalents) in a sealed ampoule for 7 days at 50° C. After the polymerization, the excess ethylene oxide was removed and the polymer was characterized by $^1H$ and $^{13}C$ NMR and MALDI-TOF mass spectrometry. FIGS. 1 and 2 shows the $^{13}C$ and $^1H$ NMR spectra in $CDCl_3$ for poly (ethylene oxide) contains sufficient resolution to characterize the end groups. The integration values of the sec-butyl end group with the —$CH_2CH_2O$— repeat unit determined the number of ethylene oxide units to be 8. FIG. 3 for the MALDI-TOF mass spectrum confirms the $^1H$ NMR result. The existence of series A (m/z 521) in FIG. 3 corresponds to 10 repeat units of ethylene oxide (m/z 10×44=440) with sec-butyl (m/z 57) and protic (m/z 1) end groups for the [M+Na]$^+$ ion. Series B (m/z 537) in FIG. 3 corresponds to the [M+K]$^+$ ion which results from the natural abundance of potassium in glassware. After 7 days at 50° C., a white precipitate was noted.

t-butyldimethylsiloxypropyllithium with [EO]/[Li]=880 Equivalents

After evacuating an all-glass reactor on the vacuum line overnight, the reactor was purged with dry nitrogen (99.998%) and t-butyldimethylsiloxy-1-propyllithium (0.32 mL, 0.16 mmol) was added by syringe through a side port. The side port was heat-sealed with a hand torch and the solvent containing the initiator removed under vacuum. Ethylene oxide (7.0 mL, 140 mmol) was vacuum distilled from $Bu_2Mg$ into the reactor. The reactor was removed from the vacuum line by heat-sealing with a hand torch and left at room temperature. The reaction was stopped after 194 h. Methanol (0.25 mL) was added and the ethylene oxide was evaporated.

Diblock Copolymers

Poly(styrene-block-ethylene oxide) diblock copolymers were made by first terminating poly(styryl)lithium with ethylene oxide (4 equivalents) in benzene to yield an alkoxy-ethylated product ($PSCH_2CH_2OLi$). After freeze-drying the polymer to remove excess ethylene oxide and benzene, neat ethylene oxide (greater than 1000 equivalents) was added. The diblock copolymer was recovered by evaporation of ethylene oxide. Precipitation of the diblock copolymer with methanol or 2:1 water: methanol mixture formed micelles and did not recover the diblock copolymer. However, precipitation of the diblock copolymer with hexane did recover the diblock. The polymerization of ethylene oxide was carried out at 0° C. and 50° C. Better results seem to be obtainable at 0° C. in terms of solubility, although the kinetics may be slower.

Figure 4:
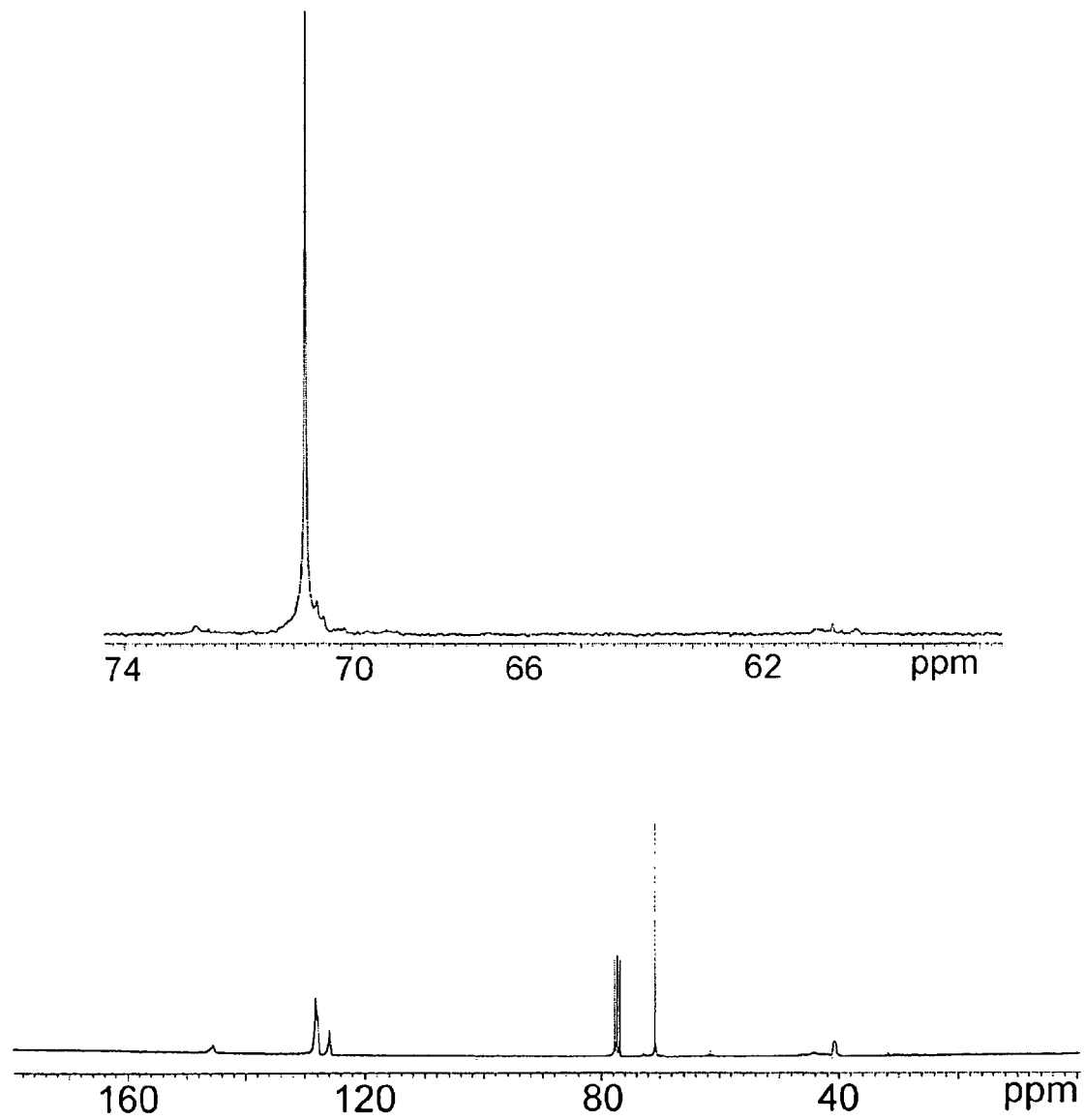
FIG. 4 is a $^{13}$C NMR spectra in CDCl$_3$ for the reaction product of PSCH$_2$CH$_2$OLi (wherein PS represents polystyrene) and neat ethylene oxide (1300 equivalents) at 50° C.
Figure 5:
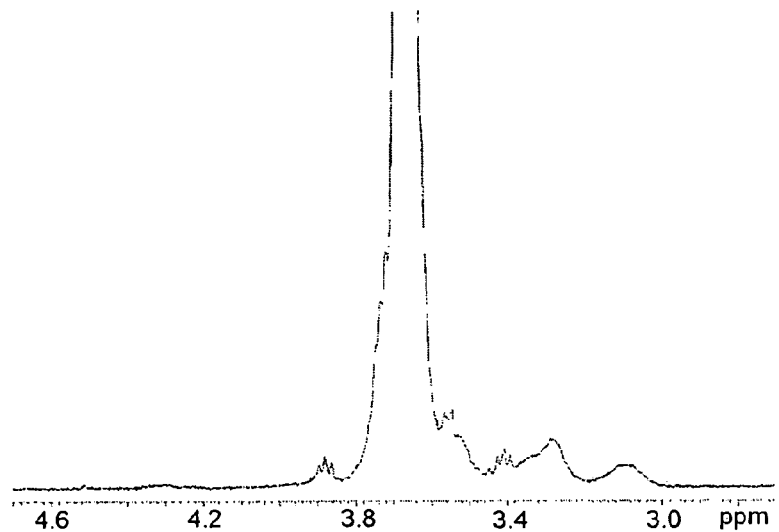
FIG. 5 is a $^1$H NMR spectra in CDCl$_3$ for the reaction product of PSCH$_2$CH$_2$OLi and neat ethylene oxide (1300 equivalents) at 50° C.
Figure 5:
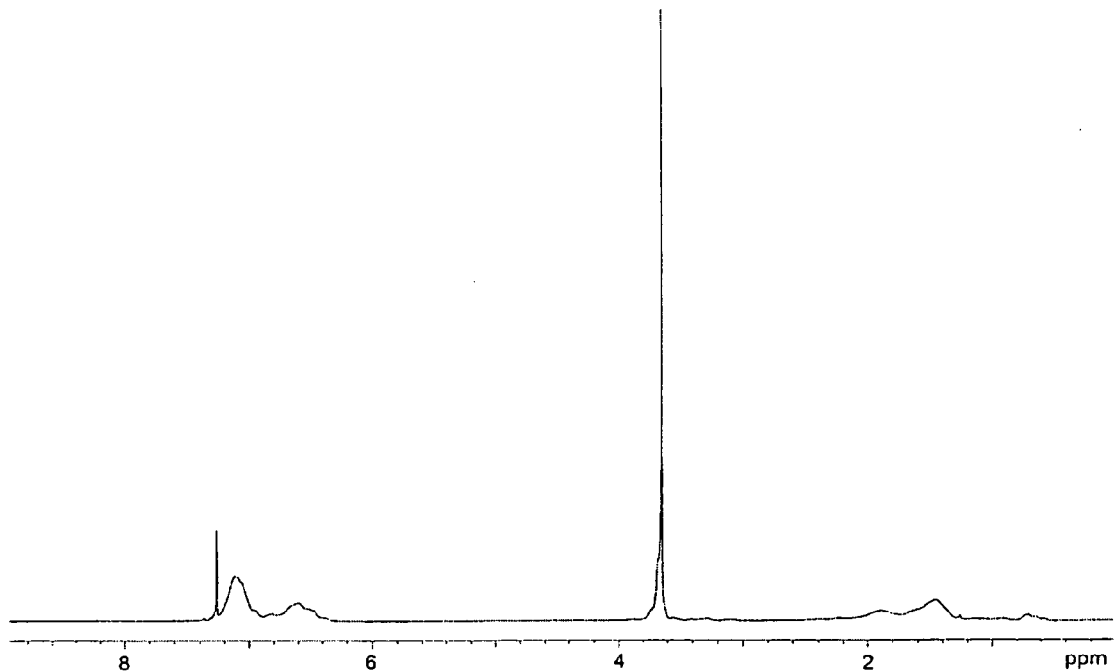
Figure 6:
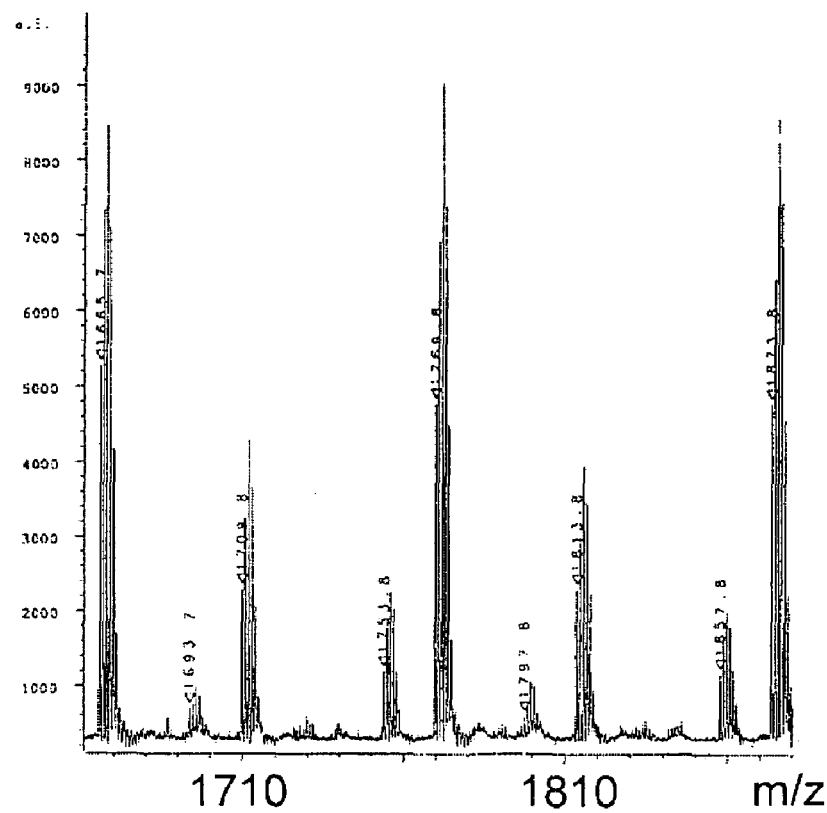
FIG. 6 is a MALDI-TOF MS for the reaction product of PSCH$_2$CH$_2$OLi and neat ethylene oxide (1300 equivalents) at 50° C. The Ag cation was used and the polymer solution was made in THF.
Figure 6:
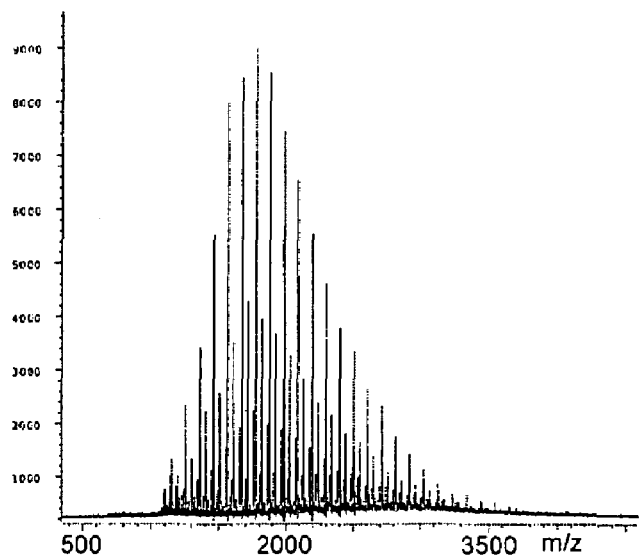

FIGS. 4 and 5 show the $^{13}C$ and $^1H$ NMR spectra of the resulting diblock copolymers for neat ethylene oxide polymerization at 50° C., respectively. The ethylene oxide resonance for the diblock can be seen at d 3.7 ppm. The $^1H$ NMR integration results in FIG. 5 are consistent with 18 styrene units and 15 ethylene oxide units. However, in FIG. 6*a*, the MALDI-TOF MS at m/z 1666 corresponds to 14 styrene units (m/z 14×104.1=1457) and one ethylene oxide (m/z 44) unit with sec-butyl (m/z 57) and protic (m/z 1) end groups for the [M+Ag]$^+$ ion. Smaller amounts of 14 styrene units (m/z 14×104.1=1457) and 2 (m/z 2×44=88) or 3 (m/z 3×44=132) ethylene oxide units with sec-butyl (m/z 57) and protic (m/z 1) end groups were detected for the [M+Ag]$^+$ ion at m/z 1710 and m/z 1754, respectively. A solvent or cation effect may exist because the NMR was taken in $CDCl_3$ and the diblock copolymer solution for MALDI-TOF MS used THF and a Ag cation (also in THF). To further investigate the discrepancy between $^1H$ NMR and MALDI MS, the cation was changed to sodium (prepared in THF) and the diblock copolymer was dissolved in chloroform. The MALDI MS (see Appendix 4) detected a m/z 1053 peak corresponding to 3 styrene units (m/z 3×104=312) and 15 ethylene oxide units (m/z 15×44=660) with sec-butyl (m/z 57) and protic (m/z 1) end groups for the [M+Na]$^+$ ion. It is unclear from the MALDI MS whether diblock copolymers with equal block lengths of styrene and ethylene oxide are present because the Ag cation seems to favor the styrene blocks and the Na cation seems to prefer the ethylene oxide block. Precipitated polymer was observed in neat ethylene oxide at 50° C. and it is reasonable to assume the longer styrene blocks are not as soluble as the shorter styrene blocks. In this case, the preferred solubility of the shorter styrene blocks in neat ethylene oxide at 50° C. explains the existence of a diblock copolymer with 3 units of styrene and 15 units of ethylene oxide while a longer styrene block only had 1–2 ethylene oxide units.

Figure 7:
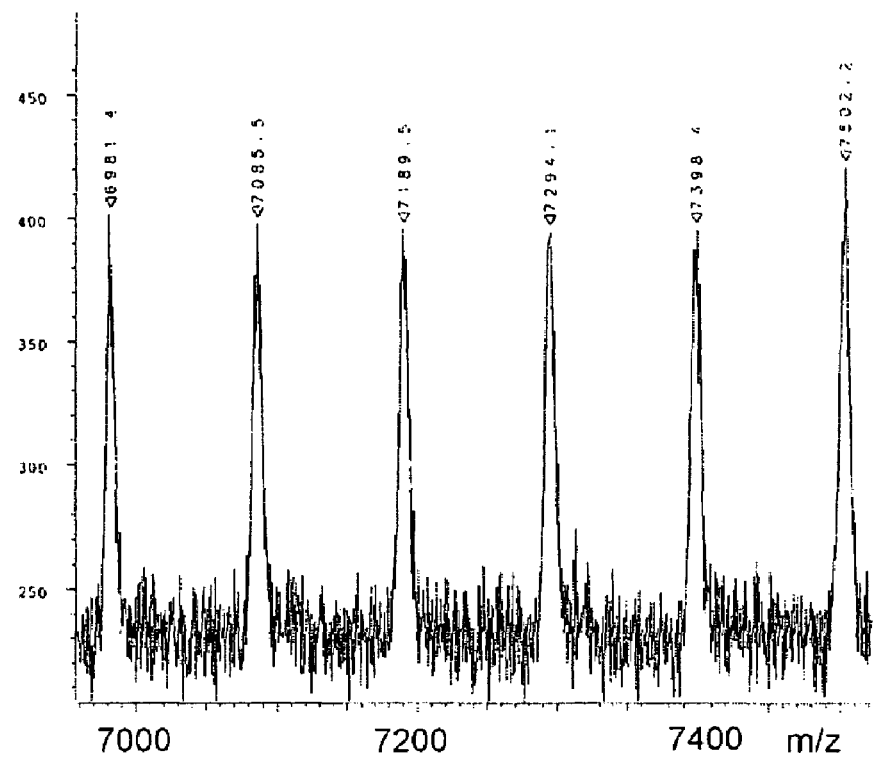
FIG. 7 is a MALDI-TOF mass spectra for polystyrene-polyethylene oxide diblock copolymer in neat ethylene oxide at 0° C. taken with a Ag cation. The polymer was dissolved in THF. An expanded view is seen in (a) and the complete spectrum is seen in (b).
Figure 7:
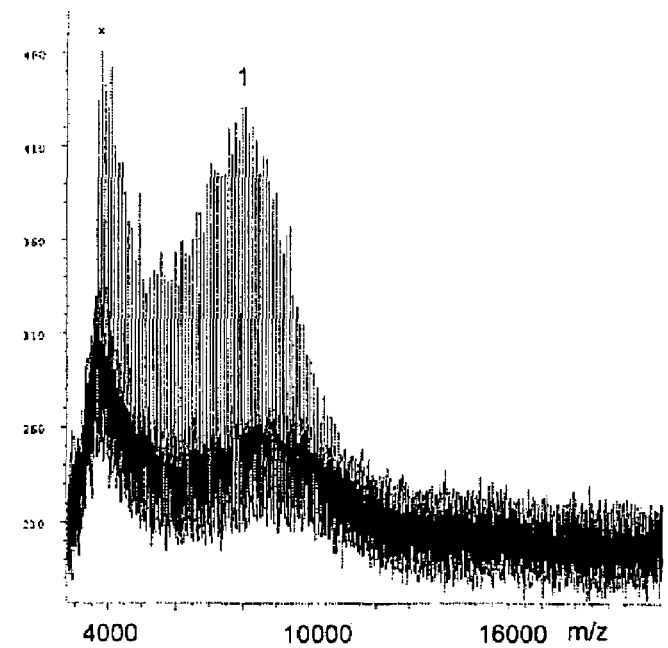

FIG. 7 shows the MALDI-TOF MS for the poly(styrene-block-ethylene oxide) diblock copolymer using neat ethylene oxide at 0° C. The peakmarked by an asterisk (*) in FIG. 7 is an artifact of the instrument and results from increasing the signal to noise ratio with the deflector mode. The spectrum of the main series (marked by a number 1) was obtained for the [M+Ag]$^+$ ion. Precipitation of polymer in neat EO was not a problem at 0° C. The m/z 7294 peak agrees with 52 styrene units (m/z 52×104.1=5413) and 39 ethylene oxide units (m/z 39×44=1716) with sec-butyl (m/z 57) and protic (m/z 1) end groups for the $[M+Ag]^+$ ion.

While the best mode and preferred embodiment of the invention have been set forth in accord with the Patent Statues, the scope of this invention is not limited thereto, but rather is defined by the attached claims. Thus, the scope of the invention includes all modifications and variations that may fall within the scope of the claims.

What is claimed is:

1. A method for synthesizing a polyoxirane comprising the step of:
   polymerizing oxiranes using a lithium-containing polymerization initiator in a liquid reaction medium, wherein the liquid reaction medium is substantially devoid of any Lewis acids and Lewis bases beyond any compound or compounds that contain one or more ethylene oxide functionalities.

2. The method of claim 1, wherein the lithium-containing polymerization initiator is selected from the group consisting of organolithium, organonitrolithium, organosulfurlithium, organooxylithium, sulfurlithium, oxylithium, nitrolithium, phosphorouslithium, and combinations thereof.

3. The method of claim 2, wherein the lithium-containing polymerization initiator is sec-butyl lithium, polystyryllithium, or combinations thereof.

4. The method of claim 1, wherein the oxiranes are represented by the formula:

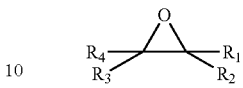

where $R_1$, $R_2$, $R_3$ and $R_4$ are independently selected from hydrogen, fluorine, alkyl, or fluorinated alkyl; and
where $R_1$, $R_2$, $R_3$, and $R_4$ are not all alkyl or fluorinated alkyl groups.

5. The method of claim 1, wherein the oxiranes are neat ethylene oxide monomers.

6. The method of claim 1, wherein the oxiranes make up a major component of the liquid reaction medium.

7. The method of claim 1, wherein neat oxiranes make up the liquid reaction medium.

* * * * *